(12) United States Patent
Paek et al.

(10) Patent No.: US 6,385,370 B1
(45) Date of Patent: May 7, 2002

(54) DEVICE AND METHOD FOR FORMING ANTI-SYMMETRIC LONG PERIOD OPTICAL FIBER GRATINGS BY MICROBENDING

(75) Inventors: Un-Chul Paek; Young-Joo Chung, both of Kwangju-Kwangyokshi; Chang-Seok Kim, Pusan-Kwangyokshi; Jong-Ho Kim, Chollanam-do; Hyun-Soo Park, Inchon-Kwangyokshi; Kyung-Ho Kwack, Kyonggi-do, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/524,278

(22) Filed: Mar. 13, 2000

(30) Foreign Application Priority Data

Mar. 11, 1999 (KR) ............................... 99/8081

(51) Int. Cl.⁷ ................................. G02B 6/34
(52) U.S. Cl. .............. 385/37; 65/392; 65/507
(58) Field of Search ............... 385/37; 65/392, 65/402, 435, 483, 507–509

(56) References Cited

U.S. PATENT DOCUMENTS

| 5,061,032 A | * 10/1991 | Meltz et al. ............... 385/33 |
| 5,216,739 A | 6/1993 | Hill et al. |
| 5,384,884 A | 1/1995 | Kashyap et al. |
| 5,411,566 A | 5/1995 | Poole et al. |
| 5,555,086 A | 9/1996 | vonBieren et al. |
| 5,708,740 A | 1/1998 | Cullen |
| 5,715,263 A | 2/1998 | Ventrudo et al. |
| 5,787,213 A | * 7/1998 | Brownlow ................. 359/900 |
| 5,796,906 A | 8/1998 | Narayanan et al. |
| 6,003,340 A | 12/1999 | Borak et al. |
| 6,011,886 A | 1/2000 | Abramov et al. |
| 6,170,297 B1 | * 1/2001 | Jang et al. ............... 264/1.27 |
| 6,229,941 B1 | * 5/2001 | Yoon et al. ............... 359/566 |
| 6,298,183 B1 | * 10/2001 | Yamauchi et al. ........... 385/37 |

FOREIGN PATENT DOCUMENTS

EP          0884 612 A2      12/1998

* cited by examiner

Primary Examiner—Akm E. Ullah
Assistant Examiner—Michelle R. Connelly-Cushwa
(74) Attorney, Agent, or Firm—Robert E. Bushnell, Esq.

(57) ABSTRACT

There is provided a device and method for forming optical fiber anti-symmetric long period gratings by microbending. In the optical fiber grating forming device, a laser system emits a $CO_2$ laser beam, a lens focuses the $CO_2$ laser beam on an optical fiber in a predetermined width, an optical fiber support fixes both ends of the optical fiber and imparts tensile strain to the optical fiber, and a controller controls the intensity of the $CO_2$ laser beam, the focusing distance of the lens, and the tensile force applied by the optical fiber support.

11 Claims, 3 Drawing Sheets

DEVICE AND METHOD FOR FORMING ANTI-SYMMETRIC LONG PERIOD OPTICAL FIBER GRATINGS BY MICROBENDING

PRIORITY

This application claims priority to an application entitled Device And Method For Forming Optical Fiber Gratings By Microbending filed in the Korean Industrial Property Office on Mar. 11, 1999 and assigned Serial No. 99-8081, the contents of which are hereby incorporated by reference.

BACKGROUND OF THE INVENTION

1. Field of the Invention

The present invention relates generally to a device and method for forming optical fiber gratings by microbending, and in particular, to a device and method for forming optical fiber gratings by subjecting an optical fiber to microbending using $CO_2$ laser beams.

2. Description of the Related Art

Long-period fiber gratings (LPFGs) are widely used in applications of a wavelength filter with a low reflectance, a gain flattening filter of an erbium-doped fiber amplifier (EDFA), and an optical fiber sensor.

In prior art, LPFGs are formed by changing the refractive index of an optical fiber core using photosensitiveness or residual stresses, or transforming the core by partial removal of a cladding. The photosensitiveness using method, however, cannot be applied to an optical fiber non-photosensitive and requires hydrogen treatment to increase photosensitiveness. Formation of LPFGs by relieving residual stresses does not produce a high filtering effect on an optical fiber in which many mechanical stresses do not remain. Furthermore, the transformation of the core by partial removal of the cladding remarkably decreases the tensile strength of an optical fiber.

Incorporated herein by reference are: U.S. Pat. No. 5,715,263 to Brian F. Ventrudo et al. entitled Fibre-Grating-Stabilized Diode Laser teaches the use of a fibre Bragg grating to stabilize the intensity and frequency fluctuations of a diode laser; U.S. Pat. No. 5,384,884 to Raman Kashyap et al. entitled Method Of Forming Optical Fibre Gratings teaches applying different longitudinal stresses to a fiber each time a Bragg grating is written with an Argon ion laser; EP Patent No. 0884612 to Michael G. Wickham entitled Method Of And Apparatus For The Automated Precision Wavelength Control Of Fiber Optic Bragg Grating Writing provides a computer controlled apparatus using a laser to generate a UV beam and a rotatable prism to write Bragg gratings on an optical fiber; U.S. Pat. No. 6,011,886 to Anatoli A. Abramov et al. entitled Recoatable Temperature Insensitive Long-Period Gratings which discuses the use of fiber's having long-period gratings; U.S. Pat. No. 5,555,086 to Karlheinz vonBieren et al. entitled Coherence Multiplexed Interferometric Signal Processing System And method describes the formation of microbends in a length of optical fiber to form a modal coupler; U.S. Pat. No. 5,216,739 to Kenneth O. Hill et al. entitled Method Of Creating An index Grating in An optical Fiber and A Mode Converter Using The Index Grating discusses exposing the fiber to UV light beams to obtain fiber gratings; U.S. Pat. No. 5,708,740 to Thomas John Cullen entitled Optical Notch Filter manufacture In Optical Fibre Waveguide By Plastic Deformation describes a technique of using a micro-flame to form microbends in a stretched optical fiber to create a notch filter; U.S. Pat. No. 5,796,906 to Chellappan Narayanan et al. entitled optical Planar Waveguide Notch Filters provides a background discussion regarding the differences between core deformed fibers and long-period grating in notch filters and provides an alternative notch filter which utilizes symmetrical corrugations formed using either a heater or a $CO_2$ laser; U.S. Pat. No. 5,411,566 to Craig. D. Poole et al. entitled Optical Fiber Spatial Mode Converter Using Periodic Core Deformation describes the use of a laser to abulate material from the side of a fiber at periodic intervals along its length and then heating those regions so that resulting surface tension effects deform the core sinusoidally; and U.S. Pat. No. 6,003,340 to Georges Borak et al. entitled Method Qf Putting A Bend into A Fiber To Make A Strain Sensor describes using a $CO_2$ laser as a heating source to form an S-shaped microbend.

SUMMARY OF THE INVENTION

It is, therefore, an object of the present invention to provide a device and method for forming fiber gratings by microbending using a $CO_2$ laser beam.

The above object can be achieved by providing an optical fiber grating forming device and method. In the optical fiber grating forming device, a laser system emits a $CO_2$ laser beam, a lens focuses the $CO_2$ laser beam on an optical fiber in a predetermined width, an optical fiber support fixes both ends of the optical fiber and imparts tensile strain to the optical fiber, and a controller controls the intensity of the $CO_2$ laser beam, the focusing distance of the lens, and the tensile force applied by the optical fiber support.

According to another aspect of the prevent invention, the optical fiber grating forming method includes the steps of focusing a $CO_2$ laser beam on an optical fiber with a predetermined width, fixing both ends of the optical fiber and applying tensile force to the fixed optical fiber, projecting the $CO_2$ laser beam onto a predetermined portion of the optical fiber to which tensile force is applied, repeating the above steps, while moving the optical fiber at predetermined intervals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

By irradiation of a laser beam, LPFGs are written within an optical fiber with many residual stresses by relieving the residual stresses, whereas LPFGs are not effected in an optical fiber with weak residual stresses. However, LPFGs can be formed even in a non-photosensitive optical fiber with weak residual stresses by periodical microbending.

Figure 1:
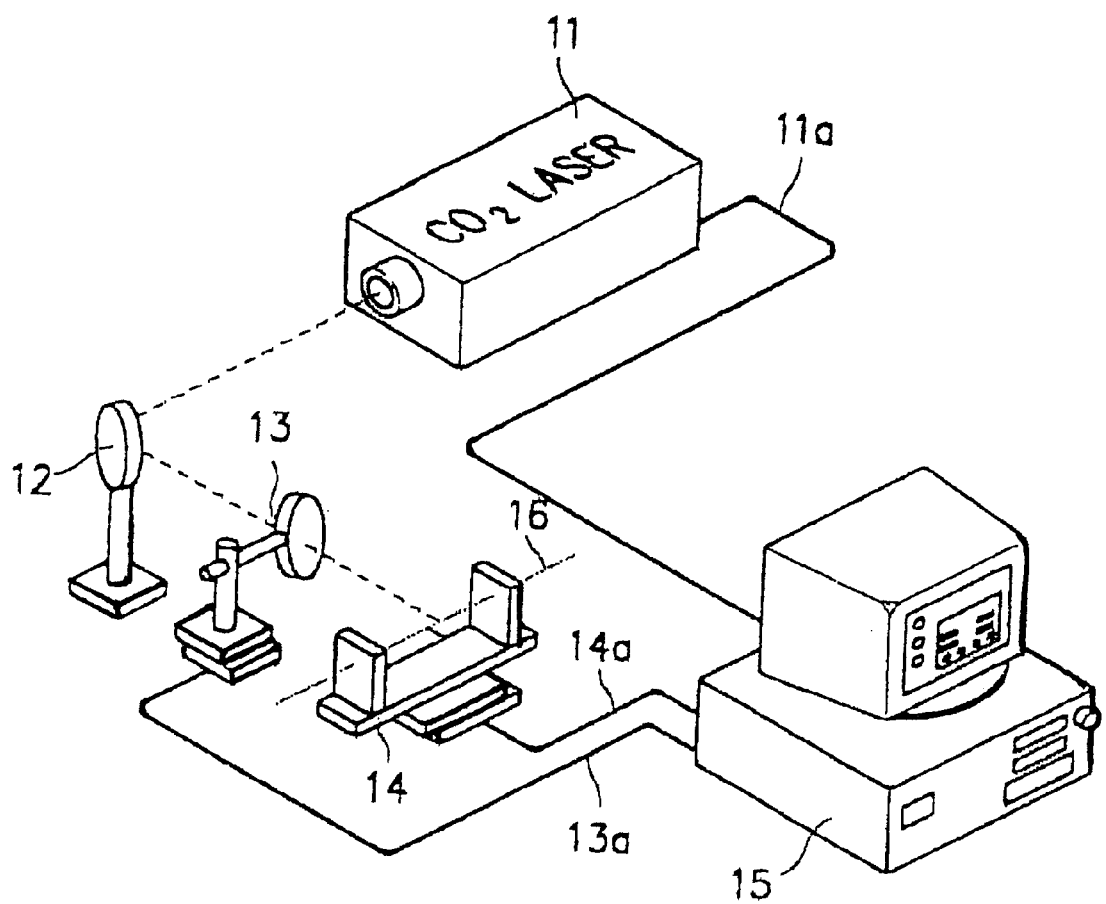
FIG. 1 illustrates an LPFG forming device using a $CO_2$ laser according to the present invention.

FIG. 1 illustrates an LPFG forming device using a $CO_2$ laser according to the present invention. The LPFG forming device is comprised of a $CO_2$ laser system 11, a reflective mirror 12, a lens 13, a shelf 14, and a controlling computer 15. The $CO_2$ laser system 11 includes, but not shown, a laser head, a power module and a remote controller. A connection cable 11a connects lase 11 to computer 15. The laser system 11 emits a $CO_2$ laser beam in pulses so that a user can adjust the intensity and power of the emitted laser beam. The pulse width and period can be controlled by the remote controller or a pulse generator connected to the remote controller. The reflective mirror 12 is plated with gold and used for controlling a beam path. The lens 13 is fabricated of zinc-selenide (ZnSe), for focusing a laser beam with an appropriate width. The focusing distance of the lens 13 is controlled according to a control signal generated from the controlling computer 15.

The shelf 14 including an optical fiber fixture is moved by a high-resolution stepping motor (not shown) controlled by the computer 15 through a kind of interface bus, GPIB (General Purpose Interface Bus) 14a. An optical fiber support in the shelf 14 fixes both ends of an optical fiber 16 and applies tensile force to the optical fiber 16.

A light source and a spectrum analyzer can be further provided to each corresponding end of the optical fiber 16, for irradiating the optical fiber 16 with white light and for analyzing the spectrum of light emitted from the optical fiber 16. Hence, the transmission spectrum of the optical fiber 16 can be observed during fabrication of the LPFGs. The controlling computer 15 controls the intensity of a $CO_2$ laser beam emitted from the laser system 11, the focusing distance of the lens 13, and the tensile force applied by the optical fiber support.

Figure 2:
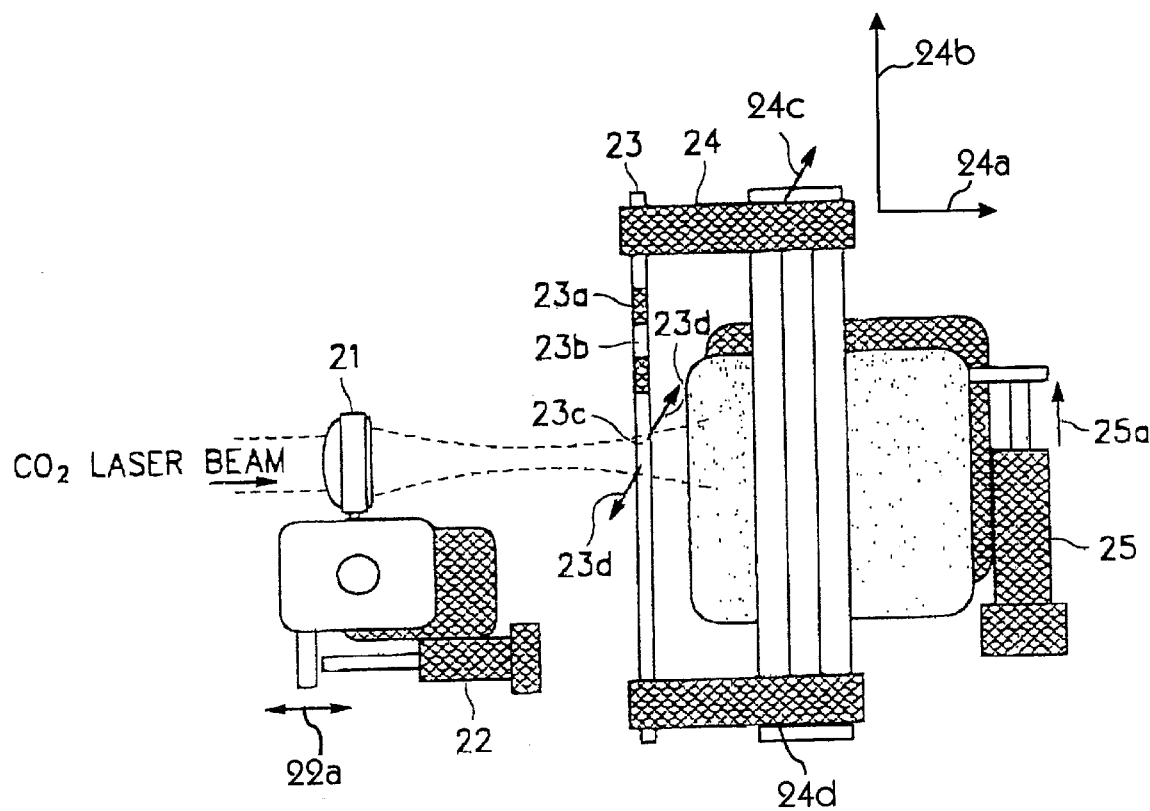
FIG. 2 is a detailed view of a lens and a shelf in the device shown in FIG. 1.

FIG. 2 illustrates the lens and the shelf shown in FIG. 1 in more detail. Referring to FIG. 2, focusing of the lens and application of tensile force to the optical fiber will be described. Reference numeral 21 denotes a lens, reference numeral 22 denotes a lens position adjuster, reference numeral 22a denotes the direction of movement of lens adjuster 22 and lens 21, reference numeral 23 denotes an optical fiber, reference numeral 24 denotes an optical fiber support, and reference numeral 25 denotes an optical fiber support position adjuster. Reference numerals 23a, 23b, and 23c respectively denote a heated region of the optical fiber at which an optical fiber grating was formed, an unheated region of the optical fiber free of an optical fiber grating, and a region of the optical fiber being heated to an optical fiber grating. Reference numeral 23d denotes the direction of tensile force applied to the optical fiber 23, reference numerals 24a and 24b denote the directions in which the optical fiber support 24 moves and reference numeral 24c shows the resulting direction of movement of support 24 in the direction 24c to apply tensile force to the optical fiber 23 without twisting the optical fiber to form anti-symmetric long period gratings when heated by the laser beam, reference numeral 25a denotes the direction in which the optical fiber support position adjuster 25 moves, and reference numeral 24d denotes the fixed end of the support.

As shown in FIG. 2, the focus of a $CO_2$ laser beam moves and the width and intensity of the beam incident on the optical fiber 23 can be controlled by moving the lens position adjuster 22 right and left. The optical fiber support 24 strains the fixed ends of the optical fiber 23 in opposite directions with an increased distance between the ends, thereby generating microbendings in the optical fiber 23. Periodical microbendings are induced by the $CO_2$ laser beam and the external tensile force applied by the optical fiber support 24.

Besides a tensile force applied by straining both ends of the optical fiber 23 in opposite directions using the optical fiber support 24, the optical fiber 23 may receive a tensile force produced by a pendulum dangling from one end of the optical fiber 23 disposed in perpendicular to the ground.

The present invention is applicable to any optical fiber susceptible to microbending, regardless of photosensitiveness, residual stresses, or a cladding structure.

In the present invention, the step of increasing the distance between both ends of the optical fiber in opposite directions is added in fabrication of optical fiber gratings using a $CO_2$ laser beam for relieving residual stresses, so that microbendings are produced in an optical fiber with weak residual stresses by application of external tensile force. Consequently, LPFGs can be formed without decreasing the physical strength of the optical fiber.

Figure 3:
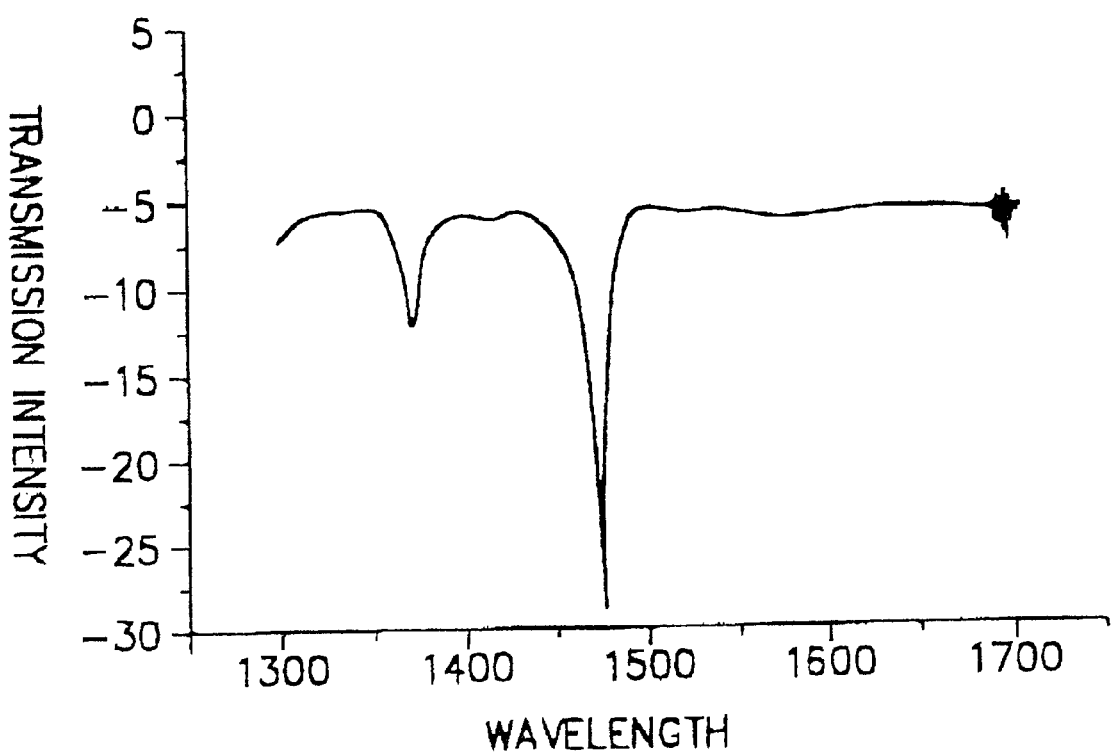
FIG. 3 is a graph showing spectrum characteristics of LPFGs formed by microbending using the device shown in FIG. 1.

FIG. 3 is a graph showing transmission spectrum characteristics of LPFGs formed by microbending in the device shown in FIG. 1. In FIG. 3, the vertical axis of the graph represents wavelength and a horizontal axis, a transmission intensity. The graph illustrates transmission characteristics of the optical fiber with gratings with respect to wavelengths.

As shown in FIG. 3, band elimination characteristics are observed around wavelengths of 1350 and 1475 nm. Microbendings are generated even in an optical fiber with weak residual stresses by application of external tensile force and as a result, LPFGs can be formed therein.

In accordance with the LPFG forming device and method according to the present invention, LPFGs can be formed in an optical fiber without decreasing its tensile strength by exposing the optical fiber to a $CO_2$ laser beam and thus generating microbendings. The LPFGs can be produced even in an optical fiber with a low photosensitiveness or insufficient residual stresses.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An optical fiber anti-symmetric long period gratings forming device comprising:
    a laser system for emitting a $CO_2$ laser beam;
    a lens for focusing the $CO_2$ laser beam on an optical fiber with a predetermined width;
    an optical fiber support for fixing both ends of the optical fiber and applying tensile force to the optical fiber; and
    a controller for controlling the intensity of the $CO_2$ laser beam, the focusing distance of the lens, and the tensile force applied by the optical fiber support to form long-period fiber gratings in said optical fiber by microbending said optical fiber at periodic intervals.

2. The optical fiber anti-symmetric long period gratings forming device of claim 1, further comprising a reflection mirror for directing the $CO_2$ laser beam emitted from the laser system to the lens by changing a beam path.

3. The optical fiber anti-symmetric long period gratings forming device of claim 1, wherein the optical fiber support strains both ends of the optical fiber in opposite directions to increase the distance between both the fiber ends at a predetermined angle.

4. The optical fiber anti-symmetric long period gratings forming device of claim 1, wherein the optical fiber support is fixed in perpendicular to the ground.

5. The optical fiber anti-symmetric long period gratings forming device of claim 1, wherein the laser system outputs the $CO_2$ laser beam in pulses.

6. The optical fiber anti-symmetric long period gratings forming device of claim 1, wherein the controller controls the intensity of the laser beam emitted from the laser system by changing the pulse width and period of the laser beam.

7. An optical fiber anti-symmetric long period gratings forming method comprising the steps of:
   (a) focusing a $CO_2$ laser beam on an optical fiber with a predetermined width;
   (b) fixing both ends of the optical fiber and applying tensile force to the fixed optical fiber;
   (c) projecting the $CO_2$ laser beam onto a predetermined portion of the optical fiber to which tensile force is applied;
   (d) repeating the steps (a), (b), and (c) while moving the optical fiber to form long-period fiber gratings in said optical fiber by microbending said optical fiber at predetermined intervals.

8. The optical fiber anti-symmetric long period gratings forming method of claim 7, wherein the $CO_2$ laser beam is emitted in pulses.

9. The optical fiber anti-symmetric long period gratings forming method of claim 7, wherein the intensity of the $CO_2$ laser beam is controlled by changing the pulse width and period of the laser beam.

10. The optical fiber anti-symmetric long period gratings forming method of claim 7, wherein both ends of the optical fiber are strained in opposite directions with an increased distance between both the fiber ends at a predetermined angle in the step (b).

11. The optical fiber anti-symmetric long period gratings forming method of claim 7, further comprising the step of irradiating white light onto one end of the optical fiber and analyzing the spectrum of light emitted from the other end of the optical fiber.

* * * * *